United States Patent [19]
Yonemoto et al.

[11] 4,122,464
[45] Oct. 24, 1978

[54] DIAPHRAGM CONTROL DEVICE FOR FLASH PHOTOGRAPHY

[75] Inventors: Tomoo Yonemoto; Hiroaki Ishida; Yukio Morino; Masanori Watanabe; Eiichi Onda, all of Chiba, Japan

[73] Assignee: Seiko Koki Kabushiki Kaisha, Japan

[21] Appl. No.: 813,768

[22] Filed: Jul. 7, 1977

[30] Foreign Application Priority Data

Jul. 9, 1976 [JP] Japan ............................. 51-91546[U]

[51] Int. Cl.² .......................... G03B 7/14; G03B 9/02
[52] U.S. Cl. ....................................... 354/29; 354/43; 354/271; 354/274
[58] Field of Search ..................... 354/27, 29, 30, 38, 354/43, 47, 139, 149, 230, 234, 235, 271, 274

[56] References Cited
U.S. PATENT DOCUMENTS 3,856,393   12/1974   Ogihara et al. ................. 354/230 X

*Primary Examiner*—Michael L. Gellner
*Attorney, Agent, or Firm*—Robert E. Burns; Emmanuel J. Lobato; Bruce L. Adams

[57] ABSTRACT

A diaphragm control device for flash photography is incorporated in a programming electric eye camera including an exposure control circuit and capable of automatically setting exposure time and diaphragm aperture according to the light of subject, the exposure control circuit has a photoconductive element and is adapted for controlling an electromagnet.

The device includes a diaphragm lever operating in a fixed manner by the action of a spring to define diaphragm aperture, a control arm of a distance setting member, a diaphragm regulation lever controlled by the control arm and a change lever for interchanging first or second positions, at respective positions the diaphragm regulation lever being out of or in the turnable area of the diaphragm control lever.

For daylight photography, the diaphragm regulation lever is forced by the change lever to be at the first position, and the diaphragm operating lever is controlled by an exposure control circuit to form a programming shutter adapted for automatically setting exposure time and diaphragm aperture according to the light of subject. On the other hand for flash photography, the diaphragm regulation lever is forced by the change lever to be in the second position, and the diaphragm operating lever is controlled alternatively either by said diaphragm regulation lever or by the exposure control circuit dependent on the light of subject so as to accomplish an exposure through the smaller of respective diaphragm apertures dependent on camera-subject distance and on scene light.

1 Claim, 11 Drawing Figures

FIG. 10b

DIAPHRAGM CONTROL DEVICE FOR FLASH PHOTOGRAPHY

BACKGROUND OF THE INVENTION

The present invention relates to a diaphragm control device, for flash photography, and in particular to a diaphragm control device for flash photography incorporable in a programming electric eye camera, the camera including an exposure control circuit and capable of automatically setting exposure time and diaphragm aperture according to the light of subject, the exposure control circuit having a photoconductive element and adapted for controlling an electromagnet.

A camera, for daylight photography, permitting a diaphragm aperture dependent on the light of subject to be set by an automatic control device or permitting exposure time and diaphragm aperture in combination to be automatically set and, for counter-light photography or the like, permitting use in combination with a flashlight unit for complementary light for the correction have been known. Such camera however has the disadvantage that for low brightness of subject, the use in combination with a flashlight unit results in a marked overexposure. Since, for low brightness of subject, a large diaphragm is set by the automatic exposure control device, combined use with a flashlight unit results at short camera-subject distance in overexposure of a few stops. In order to remove the abovementioned fault, it is possible for a camera capable of displaying a diaphragm aperture dependent on a manually set exposure time to correct exposure time so as to be set to a diaphragm dependent on camera-subject distance. A programming electric eye camera permitting exposure time and diaphragm aperture to be at a time set depending on light of subject however is impossible to be free of the abovementioned fault.

SUMMARY OF THE INVENTION

It is an object of the present invention is to provide a diaphragm control device incorporable in a programming electric eye camera to enable daylight photography in the combined use with a flashlight unit without resulting in over-exposure. With this object, the embodiment of the present invention is a diaphragm control device for flash photography incorporable in a programming electric eye camera, the camera including an exposure control circuit and capable of automatically setting exposure time and diaphragm aperture according to the light of subject, the exposure control circuit having a photoconductive element and adapted for controlling an electromagnet, comprising a diaphragm operating lever actuated by the release operation and operating in a fixed manner by the action of by a spring to define diaphragm aperture, a control arm of a distance setting member, a diaphragm regulation lever controlled by said control arm and a change lever for interchanging first and second positions, at respective positions said diaphragm regulation lever being out of or in the turnable area of the diaphragm operating lever, whereas for daylight photography, the diaphragm regulation lever is forced by said change lever to be at said first position, and the diaphragm operating lever is controlled by an exposure control circuit to form a programming shutter adapted for automatically setting exposure time and diaphragm aperture according to the light of subject, and for flash photography, said diaphragm regulation lever is forced by said change lever to be in said second position, and the diaphragm operating lever is controlled alternatively either by said diaphragm regulation lever or by said exposure control circuit dependent on the light of subject to define diaphragm aperture for an actual exposure.

The feature of the present invention consists in that for flash photography, the diaphragm regulation lever controlled by the control arm of the distance setting member is forced by the control of the change lever to move into the turnable area of the diaphragm operating lever serving for defining diaphragm aperture, the diaphragm operating lever being destined to be actuated by the release operation, urged in a fixed manner by a spring and controlled for daylight photography by an exposure control circuit as a programming shutter adapted for automatically setting exposure time and diaphragm aperture according to the light of subject, thereby the diaphragm operating lever is controlled alternatively either by said diaphragm regulation lever of by said exposure control circuit dependent on the light of subject so as to accomplish an exposure through the smaller of respective diaphragm apertures dependent on camera-subject distance and on light subject.

DESCRIPTION OF THE PREFERRED EMBODIMENT

In Figures, the numeral 1 refers to the base plate of a shutter provided with an aperture 1a through which a film is exposed to light. A shutter release member 2 urged upwardly by a spring 5 is provided with guide slots 2a and 2b, which are in engagement with respective pins 3 and 4 carried rigidly on the base plate 1 and permit vertical movement of the release member 2, another pin 2c, a protrusion 2d, an arm 2e, a lower edge 2f, a stepped portion 2g and lugs 2h and 2i. A locking lever 6 composed of two arms 6a and 6b and pivoted on an axis 7 carried rigidly on the base plate 1 and urged counterclockwise by a spring 8, the arm 6b being destined to be struck by a pin 2c on the release member 2. A setting member 9 is provided with guide slots 9a and 9b, which are engaged with respective pins 10 and 11 carried rigidly on the base plate 1 and permit the setting member 9 to move in its longitudinal direction, and with lugs 9c, 9d, 9e and 9f, the lug 9c being engageable with the arm 6a of the locking member 6, and urged to the right by a spring 12. A diaphragm operating lever 13 having pins 13a, 13b and 13c, the pin 13b being engaged with the lug 9d of the setting member 9, one arm 13d of the lever 13 being destined to be struck is pivoted on an axis 14 carried rigidly on the base plate 1 and urged counterclockwise by a spring 15. Exposure blades 16 and 17 serving also as diaphragm blades are provided with slots 16a and 17a respectively and pivoted on a pin 18 carried rigidly on the base plate 1. A driving member or cam 19 having pins 19a, 19b and 19c, the pin 19a engaging with the actuating arm 2e of the release member 2, a step 19d and a notch 19g is pivoted on a pin 20 carried rigidly on the base plate 1 and urged counterclockwise by a spring 21. The spring 21 is selected to be lower in power than the spring 5 of the release member 2. A controlling member 22 having a tip 22a engageable with the step 19d of the driving member 19, and another tip 22b which rests against the periphery 19e and carrying an armature 23 is pivoted on an axis 24. A resilient member 25 urging the controlling member 22 counterclockwise and having a V-curved portion 25a hooking the edge 22c of the control member 22 and connected to the lower edge 2f of the release member 2, and an arm portion 25b resting on a pin 26 is pivoted on the axis 24 of the control member 22. A locking lever 27 having a locking arm 27a and another arm 27c destined to be struck by the pin 19b on the driving member 19, the edge 27b of the arm 27c being always engaging with the protrusion 2d of the release member 2, is pivoted on axis 28 carried rigidly on the base plate 1 and is urged counterclockwise by a spring 29. The spring 29 is selected to be smaller in power than the spring 21. A closing member 30 having a pin 30a which is destined to strike the arm 13d of the diaphragm operating member 13, another pin 30b which engages with the lug 9e of the setting member 9 and a step 30c is pivotally mounted on an axis 31 carried rigidly on the base plate 1 and is urged clockwise by a spring 32. The spring 32 is selected to be stronger in power than the spring 15. A release prevention member 33 having a tip 33a which rests against the periphery 19e of the driving member 19 and a locking arm 33b is pivotally mounted on an axis 34 carried rigidly of the base plate 1 and is urged counterclockwise by a spring 35. When an electromagnet M described below is not operated because of either a failure due to hand trembling under a low brightness of subject in daylight or unloading of cells, the release prevention member 33 is controlled so as to be turned counterclockwise by the driving member 19 turning counterclockwise according as the release member 2 is pushed down so that the locking arm 33b of the release prevention member 33 engages with the step 2g of the release member 2. As the result the release member 2 is prevented by the release prevention member 33 from being further pushed down. This will give a warning to an operator. A guide number setting member 36 having control steps 36a to 36e corresponding to respective fixed guide numbers is mounted turnably on the body (not shown) of camera and locked at a set position by a click member 37. An intermediary member 38 having opposite tabs 38a and 38b, the tab 38a resting against the stepped edge of the guide number setting member 36, is pivotally mounted on an axis 39. A distance setting member 40 having an axis on which a distance arm 41 is pivoted is turnably mounted on the body of the camera. The upper edge 41a of the arm 41 is engageable with the tab 38b of the intermediary member 38. An operation change member 42 which moves downwardly, as viewed in Figures, in response to attaching of a flashlight unit to the camera is provided. A change lever 43 having an arm 43a to be actuated by the operation change member 42 and another arm 43b which rests against a pin 44 carried rigidly on the base plate 1 is pivotally mounted on an axis 45 carried rigidly on the base plate 1 and urged counterclockwise by a spring 46.

A diaphragm regulation member 47 having a tip 47a which rests against the arm 43a of the change lever 43, another tip 47b engageable with the lower edge 41b of the distance arm 41 and a control arm 47c engageable with the pin 13c of the diaphragm operating member 13 is pivotally mounted on an axis 48 and urged counterclockwise by a spring 49.

In the wiring diagrams of an exposure control circuit (FIGS. 6 and 7), Rp is a photoconductive element such as CdS cell for measuring brightness of the subject. $R_1$ is a variable resistor for correcting the known characteristic of the photoconductive element. $R_2$ refers to a fixed resistor limiting the exposure period for flash photography. C is a condenser which together with the photoconductive element, Rp and variable and fixed resistance $R_1$ and $R_2$ forms a known time constant circuit defining an exposure period. $T_1$ and $T_2$ are transistors. $R_3$ and $R_4$ are fixed resistors defining respective bias voltages of the transistors $T_1$ and $T_2$. M refers to an electromagnet. A standard fixed-resistor $R_5$ serves for detecting a brightness of the subject necessary to give a warning of hand trembling. Diode D enables interchange of the operation of hand-trembling warning and the exposure control operation. L is an indicator element for luminescent indication in a finder, such as photodiode, $R_6$ a fixed resistor limiting current flow of the indicator element L. $S_1$ refers to a power switch and $S_2$ to a switch for changing the hand-trembling warning operation for the exposure control operation and actuated by the lug 2h of the release member 2. $S_3$ is a timing switch connected in parallel to the condenser C and actuated by the lug 9f of the setting member 9. A switch $S_4$ actuated by the arm 43b of the change lever 43 closes to connect the fixed resistor $R_2$ in parallel to the photoconductive element Rp. $S_5$ is a switch actuated by the arm 43b of the change lever 43. When the change lever 43 is compelled to turn clockwise for flash photography, the switch $S_5$ opens to make the hand-trembling warning operation impossible and to make the release prevention lever 33 inoperative through the intermediation of the electromagnet M and the driving member 19. $S_6$ refers to a hand-operated switch, for instance, interlocked with an operating member (not shown) such as knob or the like disposed in the housing of a camera. When in the off-position, the switch $S_6$ like the switch $S_5$ makes it impossible for the release prevention lever 33 to lock the release member 2, accordingly even for exceedingly dark subject the hand-trembling operation being not caused and a long exposure being possible. $S_7$ is a switch actuated by the pin 19c on the driving member 19 and closes when hand-trembling is warned and an exposure have been completed respectively. F refers to a flash light unit such as strobo-scope or the like. A trigger switch $S_8$ for a flashlight unit F, is operated by the pin 30 on the closing lever 30. Another switch $S_9$ connected in series to the trigger switch $S_8$ and operated by the lug 2i of the release member 2 serves for preventing from mis-triggering a flash light unit. $S_{10}$ refers to a power switch for a flashlight switch F. E is a battery serving for a power source of the exposure control circuit and also of a flashlight unit. Finally 50 refers to a diaphragm for regulating the quantity of light admitted into the photoconductive element Rp.

Figure 1:
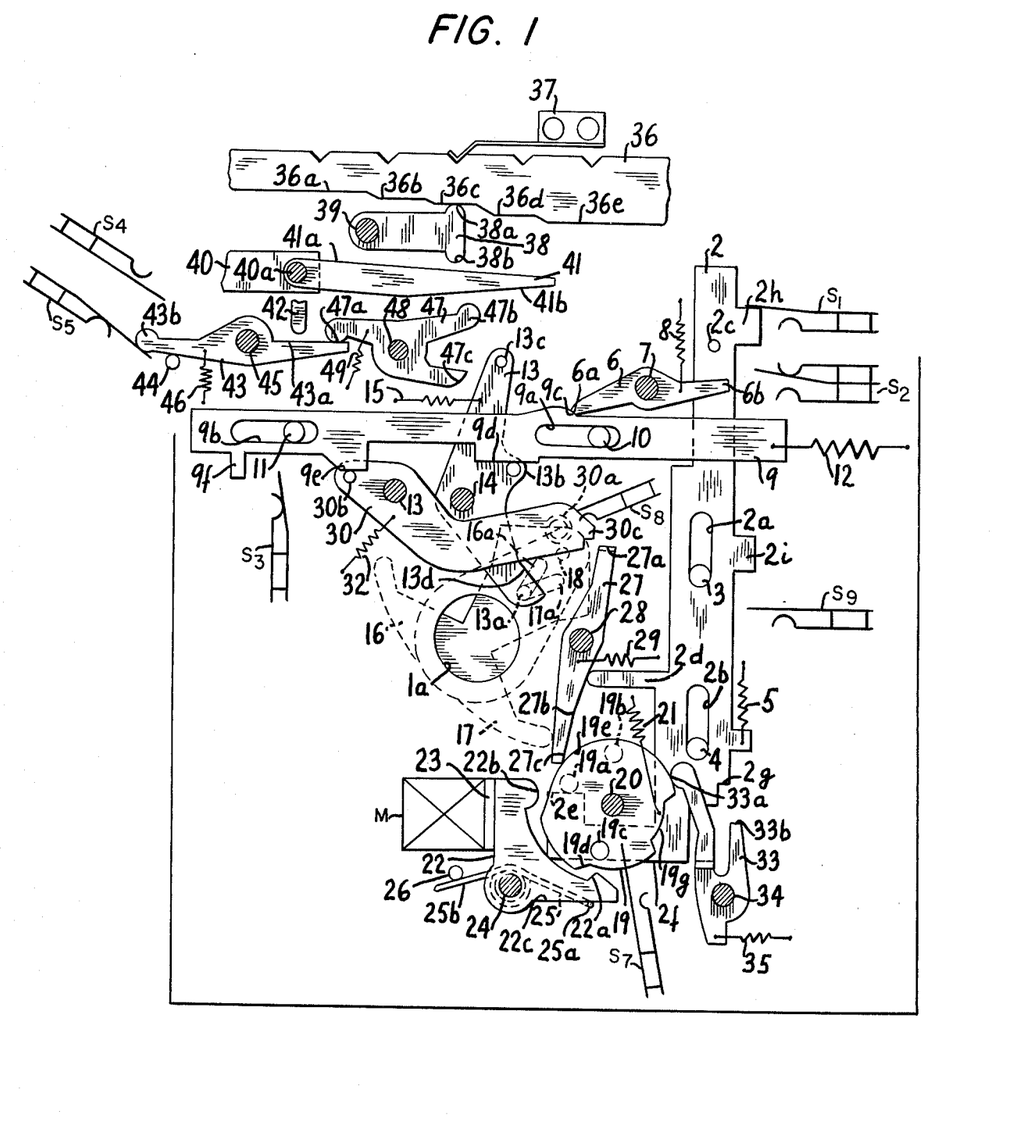
FIG. 1 is a plan view of a diaphragm control device according to the present invention; in shutter-charged and ready state for daylight photography.
Figure 2:
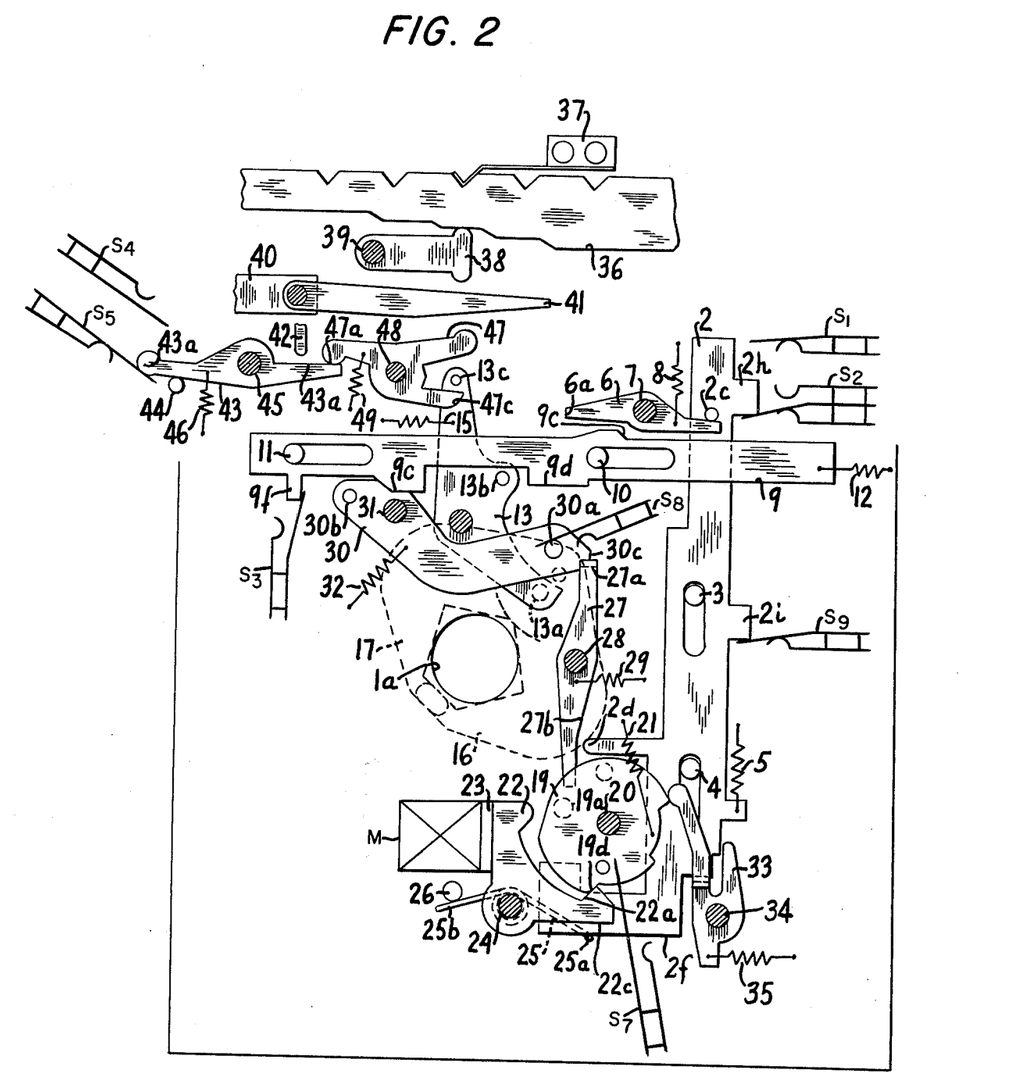
FIGS. 2 and 3 are plan views for daylight photography when exposing and an exposure have been finished respectively.
Figure 3:
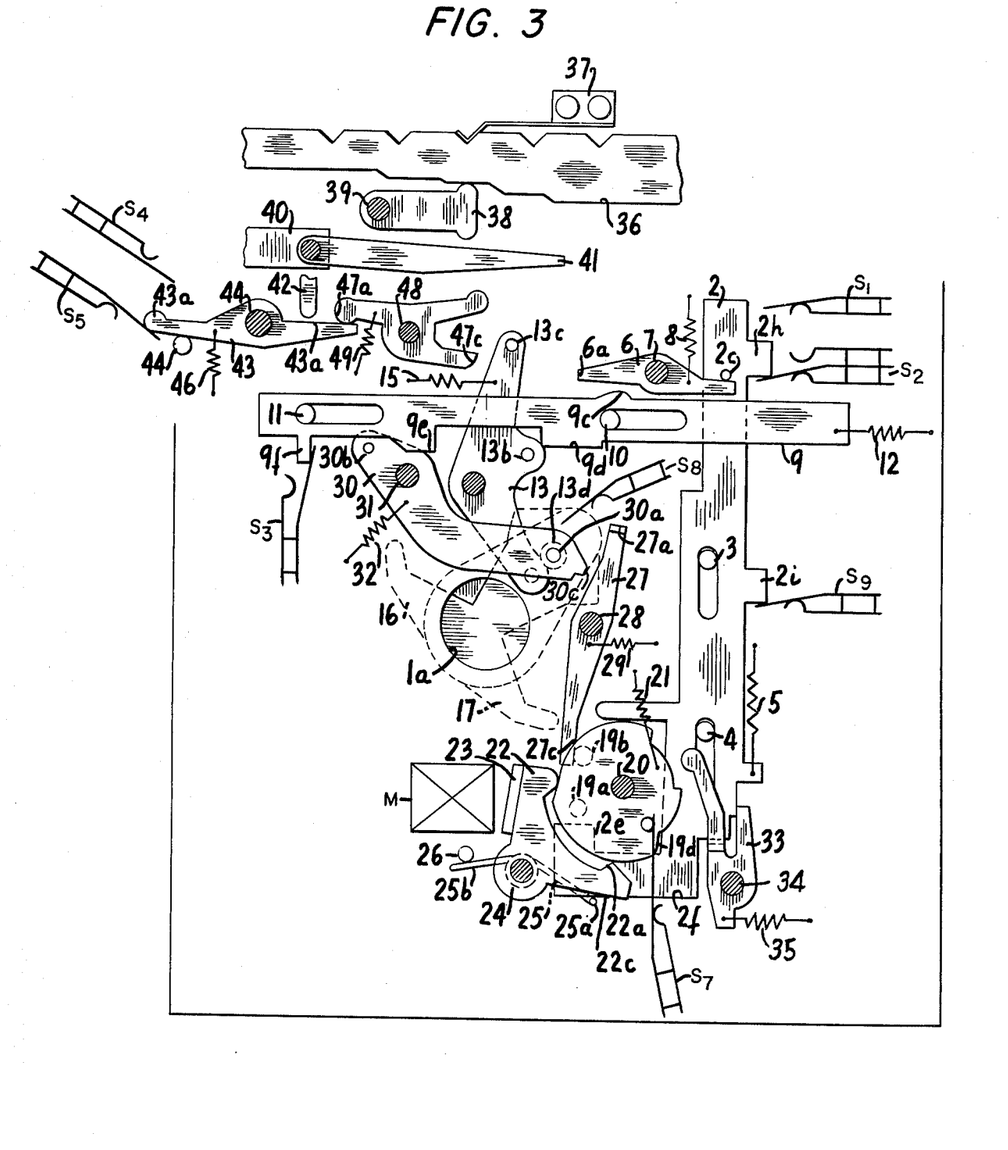
Figure 6:
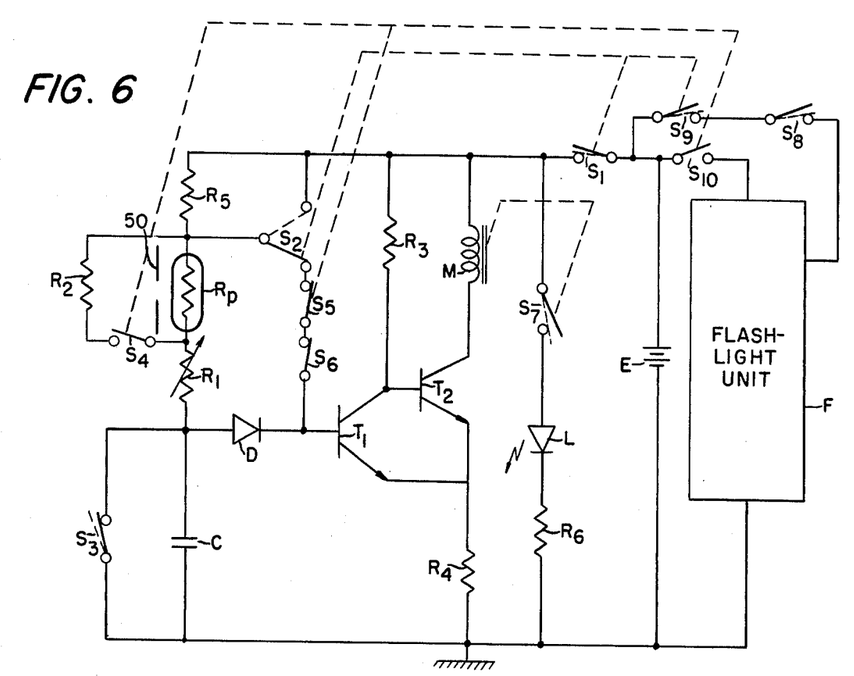
FIGS. 6 and 7 are diagrams of the exposure control circuit for daylight and flash photography respectively.

The mode of operation is described hereinafter:

If the release button is pushed down when the shutter is in the charged state as shown in FIG. 1, the release member 2 moves downwardly. Thereby are caused the following operations: The lug 2h of the release member 2 closes the power switch $S_1$ of the exposure control circuit and current flows from the battery E. If the subject is bright, then the electromagnet M is excited. As the pin 19a on the driving member 19 is pressed by the spring 21 against the tip 2e of the arm of the release member 2, the driving member 19 begins to rotate in response to the downward movement of the release member 2 and is stopped by the control lever 22 under the engagement of the step 19d of the driving member 19 with the tip 22a of the control lever 22, because the control lever 22 is compelled to be unturnable by the attraction of the armature 23 on the excited electromagnet M. The lug 2h of the release member 2 then switches the switch $S_2$ from the position of the solid line to the position of the dotted line as shown in FIG. 6. According as the protrusion 2d moves downwardly, the locking lever 27 turns counterclockwise by the spring 29 under the pressure of the its curved edge 27b against the protrusion 2d of the release member 2, and the end 27a moves to the position to be engage with the step 30c of the closing member 30. Further the V-curved portion 25a of the spring member 25 hooking the lower edge 22c of the control lever 22 is forced by the lower edge 2f of the release member 2 to be away from the lower edge 22c, and releases in cooperation with the control lever 22 the attraction of the armature 23 on the electromagnet M. The final downward movement of the release member 2 causes the pin 2c on the release member 2 to strike the arm 6b of the locking lever 6, thereby the latter turns clockwise against the spring 8. As the result in sequence the arm 6a of the locking lever 6 disengages the lug 9c, and the setting member 9 returns back to the right by the spring 12. Then the lug 9e disengages the pin 30b on the closing lever 30, the lug 9f opens the switch $S_3$ and the lug 9d disengages the pin 13b on the diaphragm operating lever 13. At once the closing lever 30 begins to turn clockwise by the spring 32 and is caused by the engagement of its step 30c with the tip 27a of the locking lever 27 to stop. Upon being disengaged, the diaphragm operating lever 13 turns counterclockwise by the spring 15, and permits the exposure blades 16 and 17 to open. The state at this time is shown in FIG. 2. When the timing switch $S_3$ opens, the condenser C begins to be charged. The charge speed depends on resistance of the photoconductive element $R_p$ corresponding to the brightness of the subject. When the charge into the condenser C reaches a fixed level, that is to say when an exposure time dependent on the brightness the subject lapses, the transistor $T_1$ operates to make the transistor $T_2$ inoperative, whereby the current flow to the electromagnet M is interrupted. Upon the electromagnet M being deenergized, the control lever 22 becomes impossible to arrest the driving member 19 urged by the spring 21 and is caused by pushing of the step 19d of the driving member 19 on the tip 22a to turn clockwise. Then the driving member 19 rotates rapidly in counterclockwise direction, and the pin 19b on it strikes the arm 27c of the locking lever 27, thereby the latter turns rapidly in clockwise direction against the spring 29. The closing member 30 is disengaged thereby and rapidly turns in clockwise direction by the action of the spring 32. Then the pin 30a on the closing lever 30 strikes the arm 13d of the diaphragm lever to cause the diaphragm lever on the way of or at the end of its counterwise movement to turn clockwise against the spring 15. As the result the exposure blades 16 and 17 close. Further the pin 19c of the driving member 19 closes the switch $S_7$ to light the indication element indicating finish of the exposure. The state at this time is shown in FIG. 3.

Figure 8:
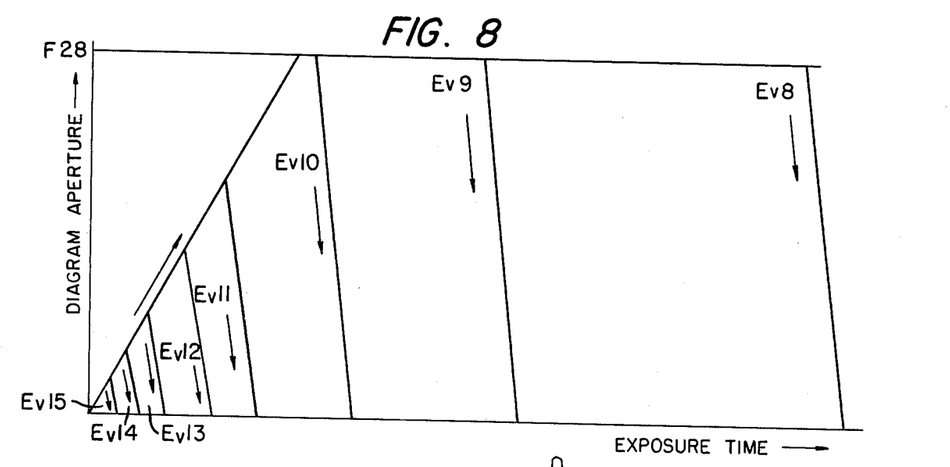
FIG. 8 is a graph showing the relation for daylight photography between exposure time and diaphragm aperture setting according to light the subject.

The exposure operation abovementioned wherein the exposure blades 16 and 17 are so controlled by the spring 15 that exposure aperture is defined according to a predetermined lapse of time, thereby both exposure time and exposure aperture being set according to the brightness of subject, enables to accomplish a proper exposure for daylight photography. FIG. 8 shows a diagram giving the relation between exposure time and exposure aperture dependent on the brightness of subject. If the operator's finger is taken off the release button, the release member 2 returns back upwardly. Then the driving member 19 is caused by the arm 2e of the release member 2 through the pin 19a to rotate clockwise against the spring 21 and to be held in the position shown in FIG. 1. Further the protrusion 2d of the release member 2 forces the locking lever 27 by travelling on the curved edge 27b of the latter to turn clockwise. The closing lever 30 if remained locked for some cause is thereby released and the exposure blades 16 and 17 are compelled to close.

For shutter charging, the setting member 9 is caused for instance in association with take-up operation of the film take-up shaft (not shown) to move to the left against the spring 12 and is locked at a fixed position by the engagement of its lug 9c with the arm 6a of the locking lever. With the leftward movement of the setting member 9, its lug 9d moves into the engagement with the pin 13b on the diaphragm operating lever 13 and arrests the lever 13 from turning counterclockwise, the diaphragm blades 16 and 17 accordingly being held in the respective closed positions. Further the lug 2f of the setting member 9 moves to close the timing switch $S_3$, consequently the condenser C is shorted. Also the lug 9e of the setting member 9 moves in engagement with the pin 30b on the closing member 30 and causes the closing member 30 to turn counterclockwise against the spring 32 and holds it in the charged position. The state is shown in FIG. 1.

Figure 7:
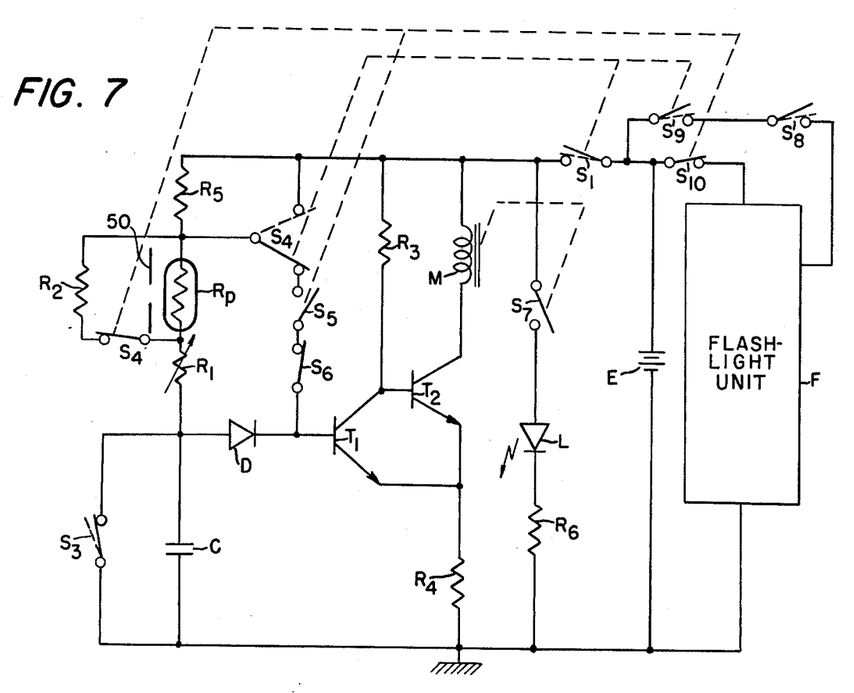
Figure 9:
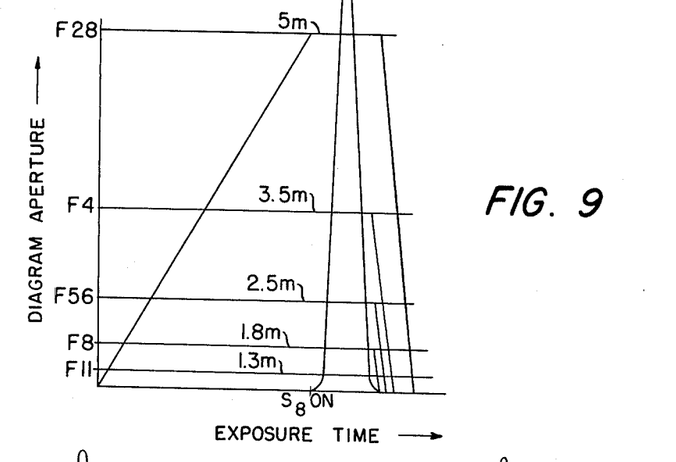
FIGS. 9, 10a and 10b are graphs respectively showing diaphragm aperture set for flash photography.

The mode of operation for flash photography is hereinafter described. When for instance a flashlight unit is attached, the operation change member 42 is pushed down to turn the change lever 43 clockwise against the spring 46. As the result the arm 43a of the change lever 43 disengages the tip 47a of the diaphragm regulation lever 47 to release the latter. A known flashmatic device in itself is composed of the guide number setting member 36, the intermediary member 38, the distance arm 41 and the diaphragm regulation lever 47. The released diaphragm regulation member 47 turns counterclockwise until it abuts against the edge 41b of the arm 41 of the distance setting member 40 set according to a camera-subject distance, this causing the arm 47c to move into the travel area of the pin 13c on the diaphragm operating lever 13 so that the exposure aperture is so regulated depending upon a set guide number and a camera-subject distance. Then the arm 43b of the change lever 43 closes the switch $S_4$ to connect the fixed resistor $R_2$ in parallel to the photoconductive element $R_p$. At the same time the switch $S_5$ is placed out of the action of the arm 43b of the change lever 43 and opens. The resultant state is shown in FIG. 7. Furthermore for a camera with a special or built-in flashlight unit, for instance the aforesaid guide number setting member 36 can be provided with a light aperture formed by a diaphragm or can be interlocked with the diaphragm member 50 for the photoconductive element $R_p$ so as to regulate light quantity admitted into the photoconductive element Rp or a film. For flashlight photography at an exceedingly low brightness of subject, the operational mode is as follows: when the release member 2 is pushed down after charging of shutter by the setting member 9, the diaphragm blades 16 and 17 begin to open in the same operational manner as for daylight photography described above. The diaphragm operating lever 13 caused to turn counterclockwise however is arrested by the arm 47c of the diaphragm regulation member 47 engaging the pin 13 on the diaphragm operating lever 13 at such a position that the diaphragm aperture is regulated depending upon distance of subject. After lapse of a fixed time of exposure, the electromagnet is deenergized and the diaphragm blades 16 and 17 close in the same operational manner for daylight photography described above. Upon the closing, lever 30 begins to clockwise turn, the pin 30a on it closes the trigger switch $S_8$ to complete the trigger circuit (not shown) of the flashlight unit F (FIG. 7) through the switch $S_9$ which has been already closed by the lug 2i of the release member 2. The trigger circuit energizes and the flashlight F lights. Time delay from a time at which the trigger switch $S_8$ closes to another time at which the diaphragm blades 16 and 17 begin to close is approximately 2 ms so that synchronization of a flashlight unit such as stroboscope is thoroughly possible. FIG. 9 shows an example of the synchronism in relation to diaphragm aperture dependent on distance of subject.

For flash photography at an exceedingly low brightness, the photoconductive element Rp which is for flash photography connected to the exposure control circuit is very great in resistance and extremly disadvantageously prolongs exposure period to the extent of several seconds. For this reason, as abovementioned, the fixed resistor $R_2$ is connected in parallel to the photoconductive element Rp so as to remove aforesaid fault. The fixed resistor $R_2$ is defined as such a value of resistance that at an exceedingly low brightness an exposure period necessary for the diaphragm blades 16 and 17 to open to their maximum is guaranteed and light aperture can be regulated depending on distance of a subject before it reaches its maximum and that at a high brightness it is negligible against the resistance of the photoconductive element Rp. The abovementioned construction is significant for the object of the present invention in view of the fact that it prevents overexposure for daylight photography in the combined use with a flash light unit though it shortens exposure time with still lower brightness than the middle compared with daylight photography.

Figure 4:
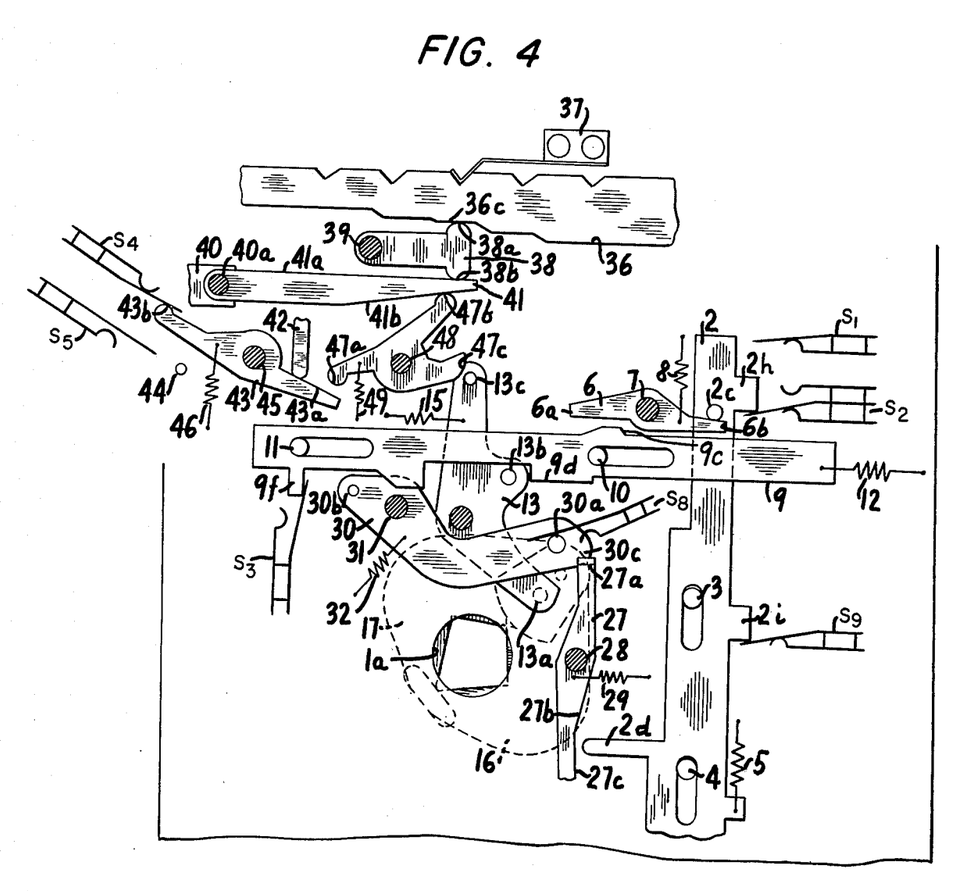
FIGS. 4 and 5 are partial plan views when exposing.
Figure 5:
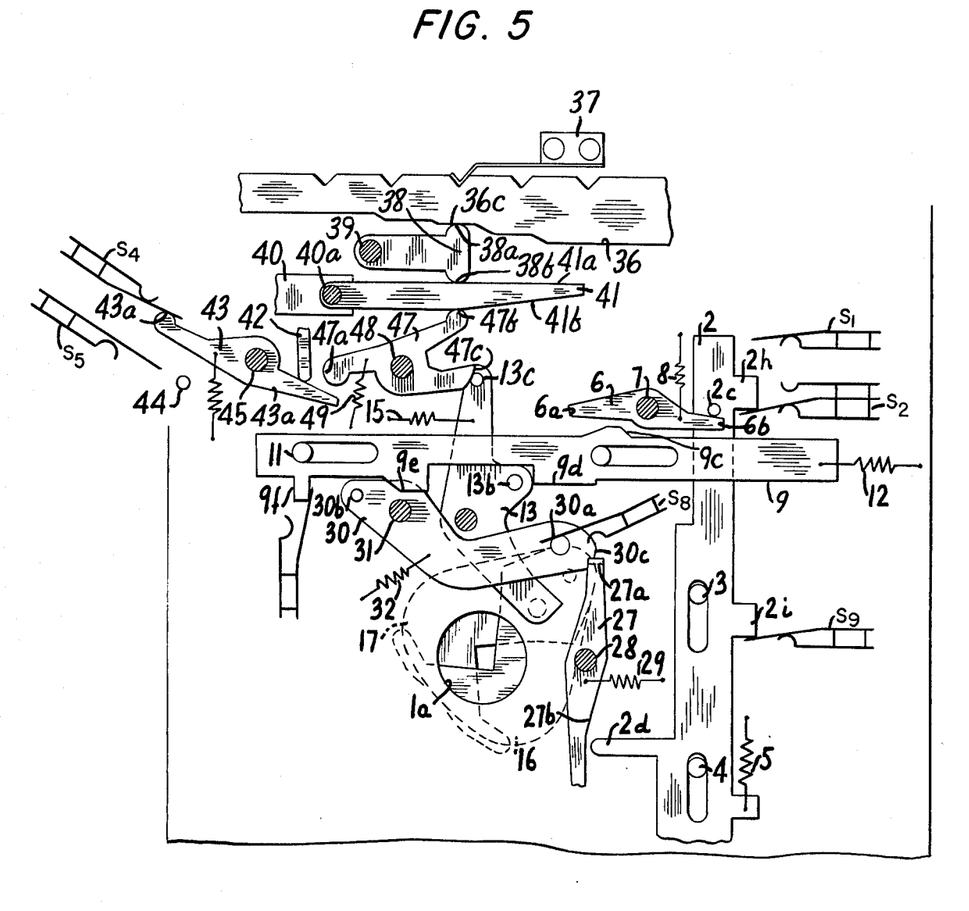
Figure 10A:
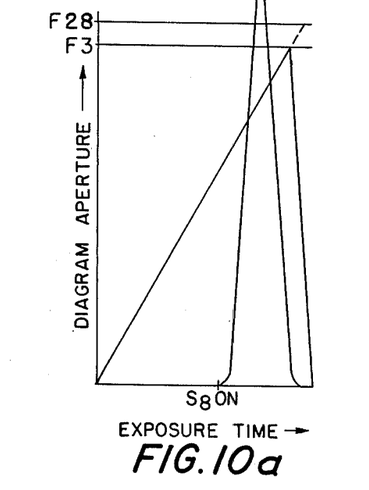
Figure 10B:
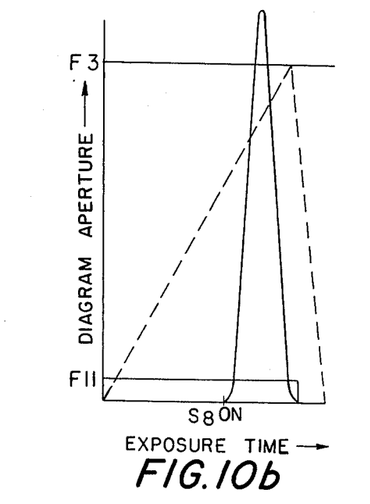

Exposure regulation for daylight photography in combined use with a flashlight unit is described hereinafter. For example, the subject having a brightness corresponding to $Ev$ 10 shown in FIG. 8 is taken at a distance of 5m. The arm 47c is set to a position regulating the diaphragm apertures to such as F 2.8 by the arm 41 of the distance setting member 40 set to the position corresponding to a distance of the subject 5 $m$, in the same way as the abovedescribed flash photography at a very low brightness. The diaphragm operating lever 13 is caused by the downward movement of the release member 2 to turn counterclockwise as abovementioned. Before the pin 13c on the diaphragm control lever 13 abuts on the arm 47c of the diaphragm regulating lever 47, an exposure period dependent on the brightness of the subject and determined by the photoconductive element Rp and the fixed resistor $R_2$ etc. elapses and the electromagnet M is deenergized. The state at this time is shown in FIG. 4. Upon the electromagnet M being disenergized, as abovementioned, the closing member 30 rapidly turns in clockwise direction to close the trigger which $S_8$, the flashlight unit then being triggered, and to turn the diaphragm operating lever 13 clockwise, thereby the diaphragm blades 16 and 17 being closed. In this way, as shown with the solid line in FIG. 10a, a diaphragm aperture dependent on the brightness of subject, such as F 3 is set. For shooting the subject, 1.3 meter away, in like light, in the same way as the above said flash photography at an extremely low brightness, the arm 47c of the diaphragm regulation lever 47 is set by the arm 41 of the distance setting member 40, adjusted at the position corresponding to a distance of 1.3 meter. By downward movement of the release member 2, the diaphragm operating lever 13 begins to turn counterclockwise and rests against the arm 47c of the diaphragm regulation member 47. This state is shown in FIG. 5. After the same time of exposure as the shooting at a distance of 5 meter, the electromagnet M is deenergized to actuate the closing lever. Then the flashlight unit is actuated and the diaphragm 16 and 17 close. In this way the diaphragm aperture such as F 11 dependent on the distance from the subject is set as shown with the solid line in FIG. 10b. Therefore the fault can be removed that the daylight photography in the combined use with flashlight at a diaphragm aperture dependent on the light of subject, such as F 3 as shown with the dotted line in FIG. 10b results in overexposure of several stops. Such diaphragm aperture regulating device operates effectively, as described in the example, throughout the extensive range of short to long distance and of low to high brightness. The device also is useful for a means for regulating diaphragm aperture depending on lapse of time to a shutter comprising a mechanical governor and others related to the diaphragm control member 13.

As described above, for flash photography, the smaller one of respective diaphragm apertures dependent on the brightness of subject and camera-subject distance is automatically selected depending on both actual conditions to accomplish a proper exposure. The camera operator can easily take pictures in the combined use with a flashlight unit under consideration of neither light of subject nor distance.

Furthermore the present invention is not limited to the abovedescribed example of the application to a programming electric eye camera comprising exposure blades which also works as diaphragm blades but can be applied quite likewise to another type programming electric eye camera comprising exposure blades separated from diaphragm blades and permitting automatic regulation of exposure time and diaphragm aperture by controlling the exposure blades and diaphragm blades in accordance with light of the subject and also permitting regulation of diaphragm aperture depending on camera-subject distance.

Also the present invention can be applied to another type camera wherein the switches $S_4$ and $S_5$ viewed in FIGS. 6 and 7 of the abovementioned example are directly connected to the control member opening and closing directly the power switch $S_{10}$ of the flashlight unit F and the change lever 43 is interlocked with the control member, thereby, besides the power switch $S_{10}$ closes, the switch $S_4$ closes, the switch $S_5$ opens and the arm 47c of the diaphragm regulation lever 47 moves into the travel area of the pin 13b on the diaphragm operating lever 13, and to another type camera comprising a change lever 43 as viewed in FIGS. 1 to 5 of the above mentioned example and operated manually independently of the preparatory operation for triggering a flashlight unit.

New programming electric eye cameras to which the above-described construction according to the present invention are available readily in relation to structure and economically because they are the same in number of structural parts and needed merely to replace a few structural parts.

What is claimed is:

1. A diaphragm control device for flash photography incorporable in a programming electric eye camera, the camera including an exposure control circuit and capable of automatically setting exposure time and diaphragm aperture according to the light of subject, the exposure control circuit having a photoconductive element and adapted for controlling an electromagnet, comprising a turnable diaphragm operating lever actuated by the release operation and operating in a fixed manner by the action of a spring to define diaphragm aperture, a control arm of a distance setting member, a diaphragm regulation lever controlled by said control arm and a change lever for interchanging first and second positions, at respective positions said diaphragm regulation lever being out of or in the turnable area of the diaphragm operating lever, wherein for daylight photography, the diaphragm regulation lever is forced by said change lever to be in said first position, and the diaphragm operating lever is controlled by an exposure control circuit to form a programming shutter adapted for automatically setting exposure time and diaphragm aperture according to the light of subject, and for flash photography, said diaphragm regulation lever is forced by said change lever to be in said second position, and the diaphragm operating lever is controlled alternatively either by said diaphragm regulation lever or by said exposure control circuit dependent on the light of subject to define diaphragm aperture for an actual exposure.

* * * * *